(12) United States Patent
Resnick et al.

(10) Patent No.: US 12,477,054 B2
(45) Date of Patent: Nov. 18, 2025

(54) THROWABLE COMMUNICATION DEVICE (71) Applicants: Blake Resnick, Las Vegas, NV (US); Shrirang Sanjay Patki, Seattle, WA (US)

(72) Inventors: Blake Resnick, Las Vegas, NV (US); Shrirang Sanjay Patki, Seattle, WA (US)

( * ) Notice: Subject to any disclaimer, the term of this patent is extended or adjusted under 35 U.S.C. 154(b) by 193 days.

(21) Appl. No.: 18/513,196

(22) Filed: Nov. 17, 2023

(65) Prior Publication Data

US 2025/0168267 A1 May 22, 2025

(51) Int. Cl.
*H04M 1/03* (2006.01)
*H04M 1/02* (2006.01)

(52) U.S. Cl.
CPC ........... *H04M 1/03* (2013.01); *H04M 1/0277* (2013.01)

(58) Field of Classification Search
CPC ...... H04M 1/03; H04M 1/0277; H04M 1/185; H04M 1/0254
See application file for complete search history.

(56) References Cited

FOREIGN PATENT DOCUMENTS

WO    WO-2014117381 A1 *  8/2014  ........... A45C 11/002

\* cited by examiner

*Primary Examiner* — Tuan D Nguyen (57) ABSTRACT

In some implementations, the device may include a modular electronics package, the modular electronics package including: a modular housing; a user interface; an electronics board coupled to the user interface; and one or more shock absorbers coupling the user interface and the electronics board to the modular housing. In addition, the device may include a substantially rigid outer shell defining an exterior surface and an interior surface. The device may include a viscoelastic inner sleeve conforming substantially to the interior surface and configured with a receptacle substantially conforming to the size and shape of the modular electronics package.

20 Claims, 10 Drawing Sheets

THROWABLE COMMUNICATION DEVICE

TECHNICAL FIELD

The present disclosure relates to configurations and structures for throwable communication devices.

BACKGROUND

Conventionally, law enforcement agencies used different types of throw phones to communicate with subjects in crisis situations. A throw phone is a device that consists of a handset, a microphone, a speaker, and a long cable that connects to a base unit. The base unit allows the negotiator to call and talk to the subject through the throw phone.

Some examples of throw phones are:

The CINT Commander and the 836 Tactical Throw Phone by 836 Technologies are designed to be easy to use. They have features such as recording, playback, conference calling, and remote control. The CINT Commander also has a video system that can transmit live images from the throw phone to the negotiator.

The Rescue Phone by Rescue Phone Inc. is one of the most widely used throw phones in the world. It has features such as automatic dialing, voice activation, battery backup, and caller ID. The Rescue Phone also has a video system that can provide visual information from the throw phone to the negotiator.

The Direct-Link Crisis Response Throw Phone System by Enforcement Technology Group, Inc is a wireless throw phone that eliminates the need for a cable. It has features such as encryption, GPS tracking, remote activation, and audio recording. The Direct-Link also has a video system that can capture and stream video from the throw phone to the negotiator.

The Explorer Throwable Tactical Cameras by Bounce Imaging are wireless throwable cameras.

All of these tools are used by throwing them through a window or near a structure where the subject is located. The negotiator then calls the throw phone and establishes communication with the subject. The goal is to de-escalate the situation and resolve it peacefully.

Many of these devices reside in substantially rectangular cases and are therefore not easily thrown accurately to a chosen location. Others have limited ruggedization or are difficult or costly to assemble. Some conventional throwable communication devices are relatively bulky and therefore cumbersome to deploy. Ease of deployment may be an important factor during sensitive situations in which a negotiator requires a simple process of deployment. Further, a less cumbersome rugged form factor allows negotiators to use other robotic devices to carry the throwphone and deploy it safely at a desired location. Accordingly, there is a need for improved throw phones that fulfill at least some of the deficiencies of conventional throw phones and cameras.

SUMMARY

In one general aspect, a ruggedized communication device may include a modular electronics package, the modular electronics package including: a modular housing; an user interface; an electronics board coupled to the user interface; and one or more shock absorbers coupling the user interface and the electronics board to the modular housing. The ruggedized communication device may also include a substantially rigid outer shell defining an exterior surface and an interior surface. The device may furthermore include a viscoelastic inner sleeve conforming substantially to the interior surface and configured with a receptacle substantially conforming to the size and shape of the modular electronics package In one general aspect, a method may include assembling a modular electronics package by coupling an user interface and an electronics board to a modular housing with one or more shock absorbers between the electronics package and the user interface and the modular housing. The method may also include inserting the modular electronics package into a receptacle of a viscoelastic inner sleeve, the receptacle substantially conforming to the size and shape of the modular electronics package. The method may furthermore include coupling at least two parts of a substantially rigid outer shell to the viscoelastic inner sleeve, the substantially rigid outer shell configured to substantially conform to the size and shape of the viscoelastic inner sleeve. Method may in addition include fastening the at least two parts of the substantially rigid outer shell together.

In one general aspect, a ruggedized communication device may include a modular electronics package, the modular electronics package including: The ruggedized communication device may also include a modular housing. The device may furthermore include a user interface. Device may in addition include an electronics board coupled to the user interface. The device may moreover include one or more shock absorbers coupling the user interface and the electronics board to the modular housing. The device may also include a substantially rigid outer shell defining an exterior surface and an interior surface. The device may furthermore include a multi-layer inner sleeve conforming substantially to the interior surface and configured with a receptacle substantially conforming to the size and shape of the modular electronics package, the multi-layer inner sleeve including a first sleeve layer and a second sleeve layer inside the first sleeve layer, the first sleeve layer and the second sleeve layer comprise different materials.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
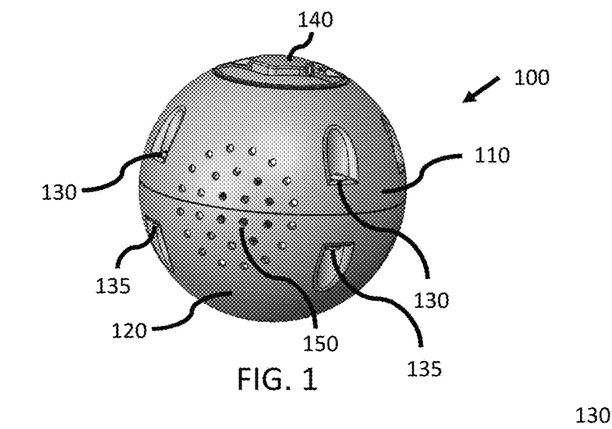
FIGS. 1-3 are various views of an illustrative embodiment of a throw phones.
Figure 2:
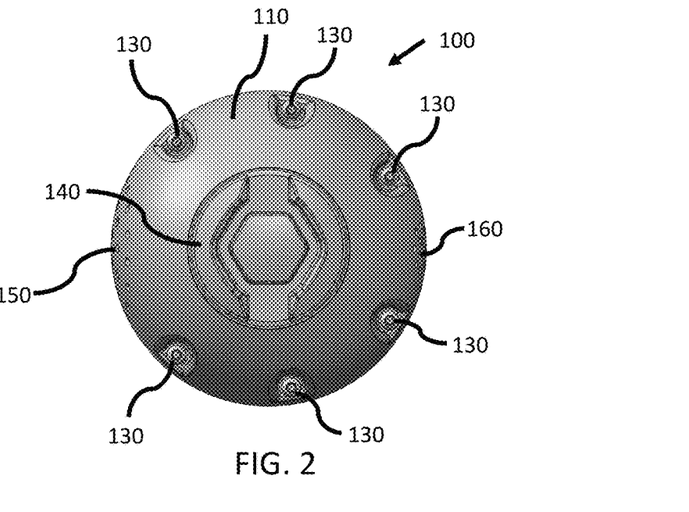
Figure 3:
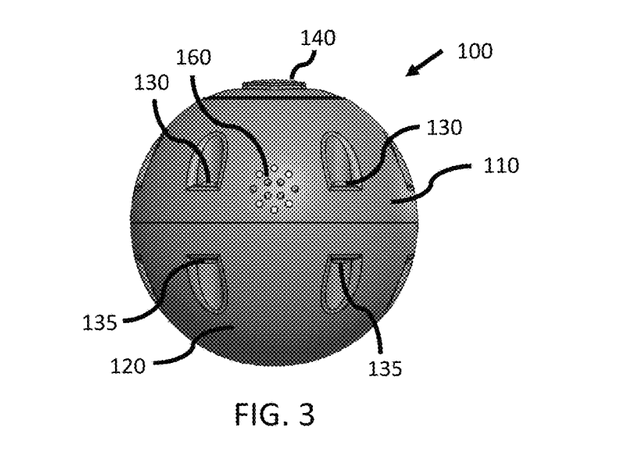

Referring now to FIGS. 1-3, an illustrative embodiment of a ruggedized ball-shaped two-way communication device or throw phone 100 is depicted in various perspective views. Throw phone 100 is configured for 2-way audio communication. The device is constructed in a substantially spherical form factor, which allows for it to be easily rolled, thrown, or otherwise launched. Throw phone 100 includes robust construction and is configured for use in adverse public safety environments, situations, and the like.

Throw phone 100 includes an upper outer shell section 110 and a lower outer shell section 120. Upper shell section 110 and lower shell section 120 are in some illustrative embodiments formed of a substantially rigid polymeric or composite material, but not limited thereto. Upper shell section 110 and lower shell section 120 are secured to each other by screws or other fasteners including but not limited to tamper resistant torx security screws 130 or the like in combination with complementary nuts 135. A threaded cap 140 may be configured to cover a user interface, such as for on/off, volume control, etc. In various embodiments, speaker holes 150 are configured in upper outer shell section 110 and a lower outer shell section 120. On a side opposite speaker holes 150, upper outer shell portion 110 is configured with microphone holes 160. Upper shell section 110 and lower shell section 120 encase communication electronics such as but not limited to cellular phone electronics or other wireless communication electronics and providing audio input through microphone holes 160 and audio output through speaker holes 150. Upper shell section 110 and lower shell section 120 are in various embodiments spherical, although other shapes may be used such as many-sided orbs, dimpled orbs, ellipsoid, etc. Upper shell section 110 and lower shell section 120 are configured to be substantially robust such that throw phone 100 can be launched through window glass, thrown or rolled, etc. In various embodiments, for example, throw phone 100 may be configured, but is not limited, to be able to survive drops from 10 feet over 100 times without incurring any breakage or malfunctioning. In comparison, other throw phones are designed to conventional MIL standards which are survival of 24 drops from 4 feet. In some embodiments upper shell section 110 and lower shell section 120 may be 3D-printed, formed from molding processes or the like.

Figure 4:
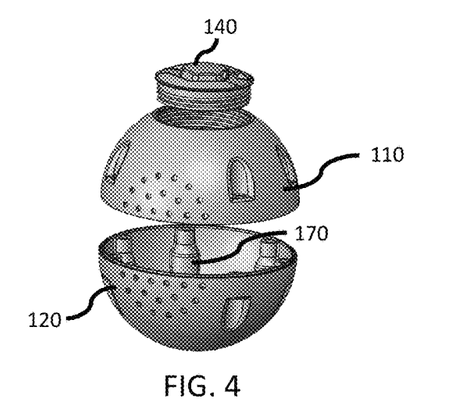
FIG. 4 is an exploded view of the throw phone outer shell of FIG. 1.

Referring now to FIG. 4, an exploded view of throw phone 100 shell is depicted. The substantially rigid outer shell includes upper shell section 110 and lower shell section 120 as well as threaded cap 140. The substantially rigid shell is designed not to bounce much when thrown from a height which allows a user to control the throw of throw phone 100 compared to materials which will cause throw phone 100 to bounce when thrown from a height. Screw pillars 170 are formed within the inner surface of upper shell section 110 and lower shell section 120.

Figure 5:
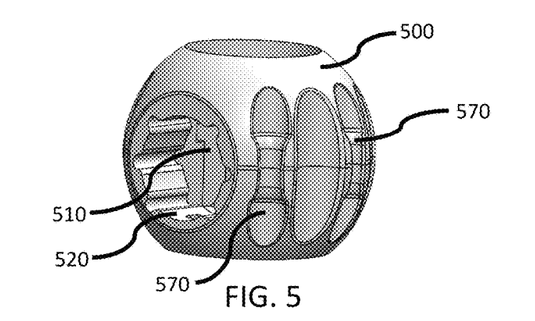
FIG. 5 is an illustrative embodiment of an inner sleeve for the throw phone of FIG. 1.

Referring now to FIG. 5, an inner sleeve 500 is formed of a viscoelastic material, such as but not limited to soft durometer (00-10 shore hardness) silicone. In accordance with various embodiments, the shock response of sleeve 500 can be further "tuned" to desired viscoelastic properties by creating air pockets in geometry to develop am optimized performance per unit weight of the device and by choice of cushioning materials. For example one applicable material is EcoFlex™ by Smooth-On, Inc., which is a soft silicone rubber product for a variety of applications including making prosthetic appliances, cushioning for orthotics and special effects applications. Sleeve 500 is not limited to silicone materials and other viscoelastic materials may be substituted depending on the design specifications. Sleeve 500 is molded to includes a receptacle 510 which is configured to receive a modular electronics package therein. Sleeve 500 also includes a speaker aperture 520 within which the speaker is configured to reside. Sleeve 500 also includes notches 570 which are configured to engage with screw pillars 170 so that sleeve 500 does not move substantially relative to upper shell section 110 and lower shell section 120.

Figure 6:
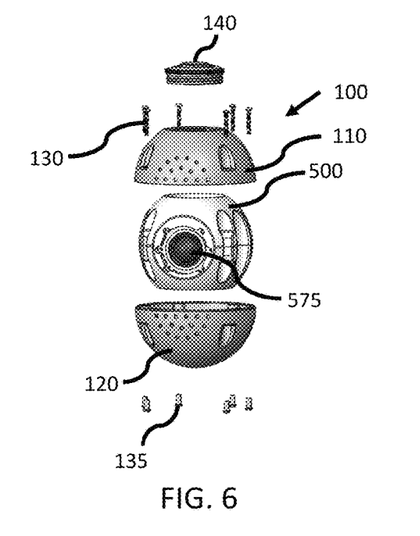
FIG. 6 is an exploded view of the outer shell and inner sleeve of the throw phone of FIG. 1.

Referring now to FIG. 6, an exploded view of a throw phone 100 is depicted. As shown, an electronics package is seated within receptacle 510 and is coupled to a speaker 575. During assembly, once the electronics package resides within sleeve 500, upper shell section 110 and lower shell section 120 may be coupled together, and encase sleeve 500, by screws 130 and nuts such as barrel nuts 135. Finally cover 140 may be screwed into place in upper shell section 110.

Figure 7:
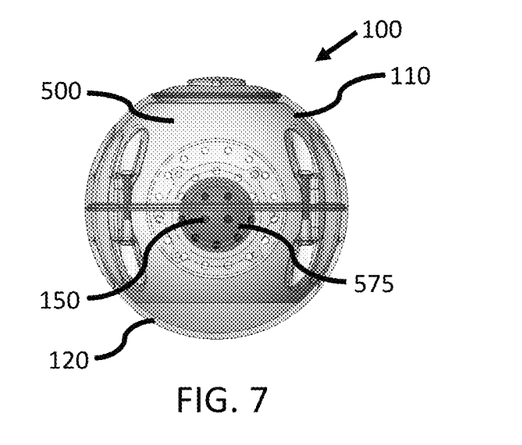
FIG. 7 and FIG. 8 depict the throw phone of FIG. 1 shown partially transparent to show the location of speaker behind speaker holes and microphone behind microphone holes.
Figure 8:
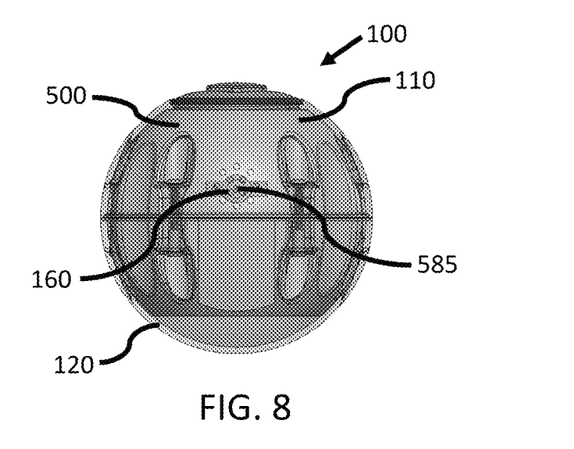

FIG. 7 and FIG. 8 depict throw phone 100 shown partially transparent in order to show the location of speaker 575 behind speaker holes 150 and microphone 585 behind microphone holes 160. In accordance with various embodiments, speaker 575 with high sound pressure level (SPL) rating and a microphone 585 with high sensitivity allowing 2-way audio communication hands-free even when the person speaking or listening are distant from throw phone 100.

Figure 9:
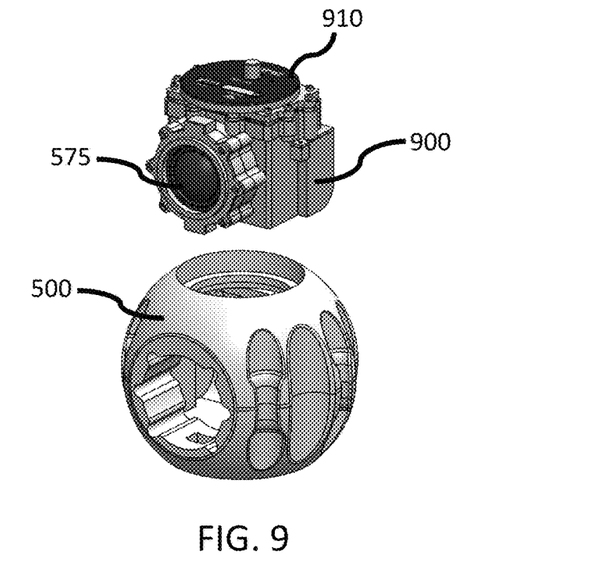
FIG. 9 is a perspective view of a modular electronics package to be fit into the inner sleeve of FIG. 5.
Figure 10:
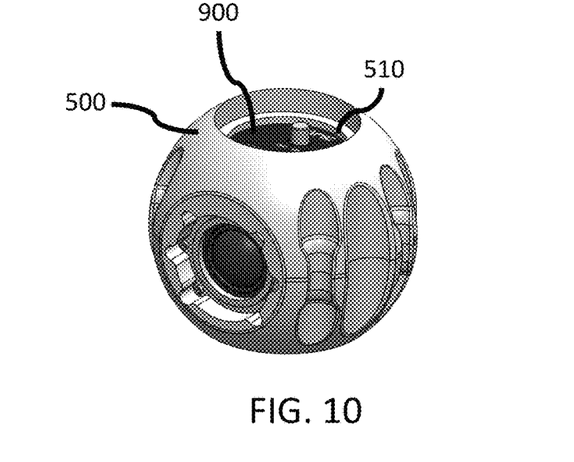
FIG. 10 depicts modular electronics package seated within receptacle of the inner sleeve of FIG. 5.
Figure 11:
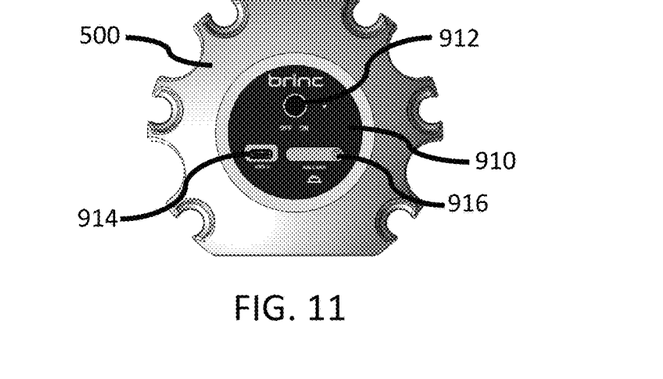
FIG. 11 is a top view of sleeve and showing user interface of the configuration of FIG. 10.

Referring now to FIG. 9, a modular electronics package 900 is depicted before being assembled with sleeve 500. Modular electronics package 900 is depicted including speaker 575 and user interface 910. FIG. 10 depicts modular electronics package 900 seated within receptacle 510. FIG. 11 is a top view of sleeve 500 and showing user interface 910. User interface 910 may have any of a variety of user controls, such as but not limited to on/off switch 912, charging and/or data port 914, and sim card slot 916.

Figure 12:
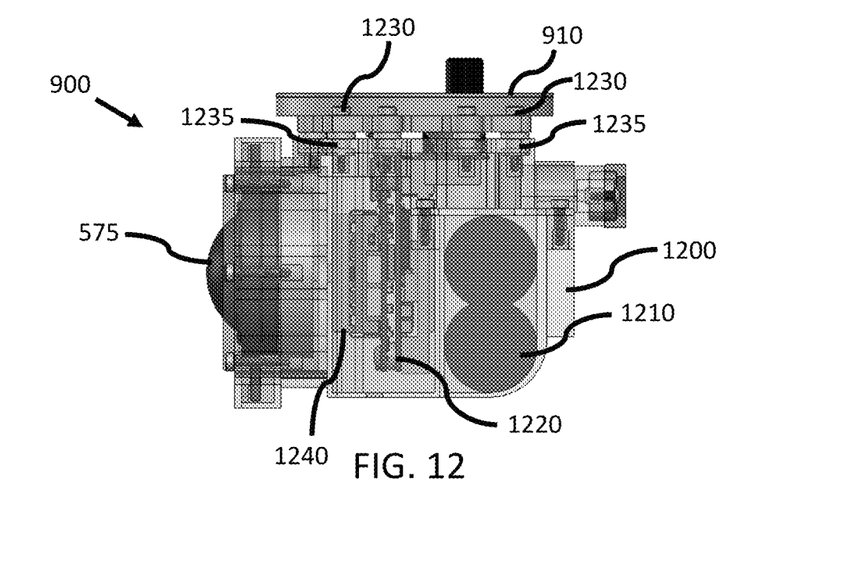
FIGS. 12 and 13 are illustrative depictions of the modular electronics module of the throw phone of FIG. 1.
Figure 13:
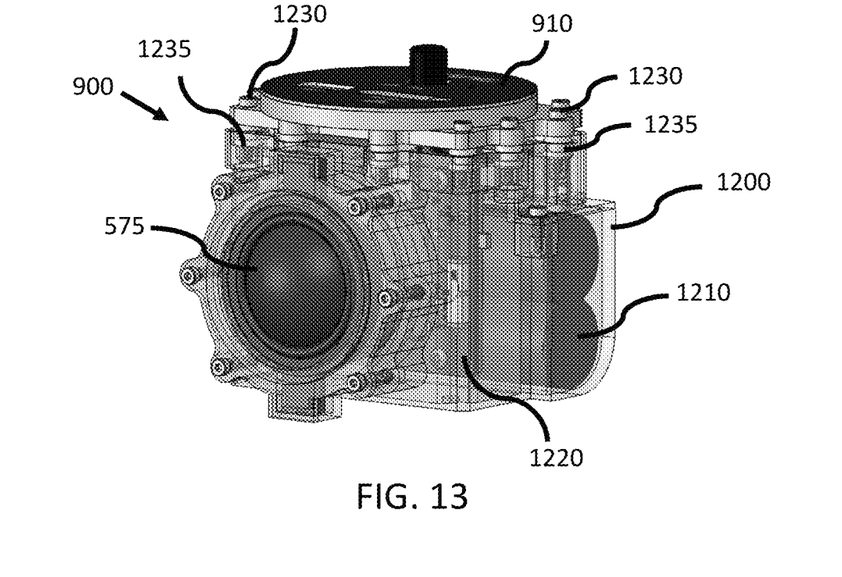
Figure 14:
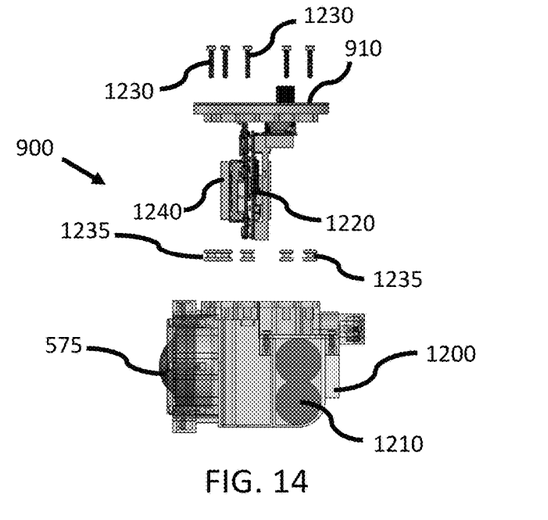
FIGS. 14 and 15 are exploded views of FIGS. 12 and 13.
Figure 15:
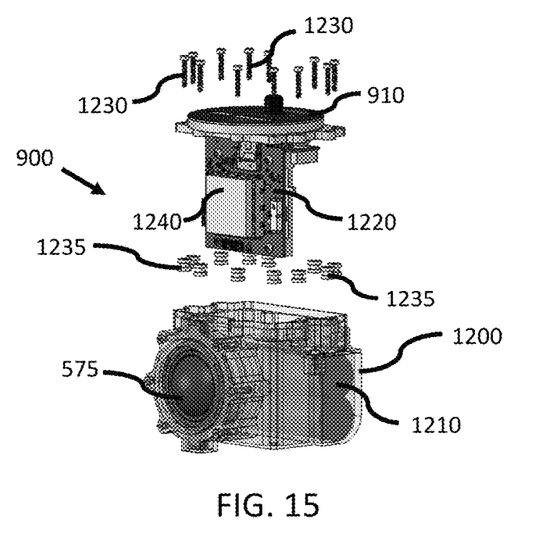

Referring now to FIGS. 12 and 13 two different views of modular electronics package 900 is depicted. Modular electronics package 900 includes user interface 910 and speaker 575 mounted to housing 1200. Housing 1200 also encases battery pack 1210 and printed circuit board (PCB) or electronics board 1220. Electronics board 1220 is configured with the wireless communications circuitry along with any digital signal processing (DSP) circuitry as well as any control circuitry for the throw phone. Electronics board 1220 may be coupled to user interface 910 both structurally and electrically. In accordance with various illustrative embodiments, user interface 910 is coupled to housing 1200 by a plurality of screws 1230 with shock absorbers 1235 surrounding each screw 1230 and dampening motion between the combination of user interface 910 and electronics board 1220 and housing 1200. Further, a shock absorbing pad such as foam pad 1240 may be placed along electronics board 1220 and engage with housing 1200. In accordance with various embodiments, electronics board 1220 may be potted in epoxy to aid in prevention of connection breakage. The epoxy potting helps to increase the natural frequencies of the electronics board to high frequencies which are much higher than the excitation wave encountered during use or impact. Further, increasing the number of supports on the board, i.e. screws 1230 and dampers 1235, tends to increase the natural frequency of the electronics board. FIGS. 14 and 15 are exploded views of FIGS. 12 and 13 respectively and are provided for additional clarity as to the support and construction as explained above. With modular electronics package 900, the package can easily be swapped out for repair or for an upgrade in the future.

Figure 16:
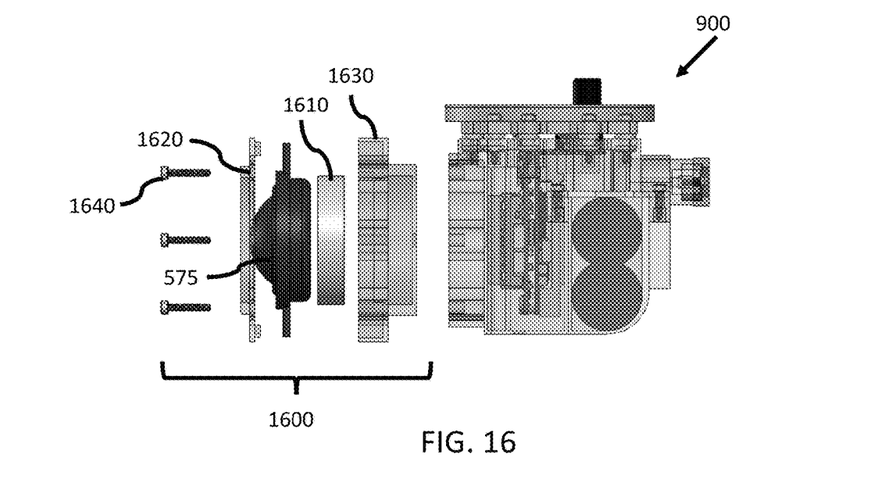
FIGS. 16-18 are illustrative embodiments of the speaker assembly.
Figure 17:
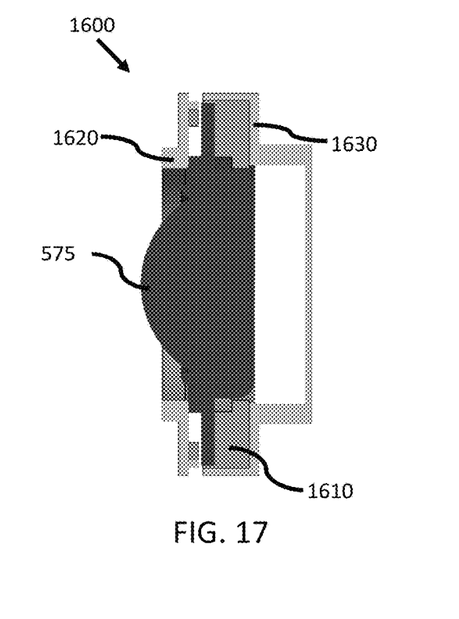
Figure 18:
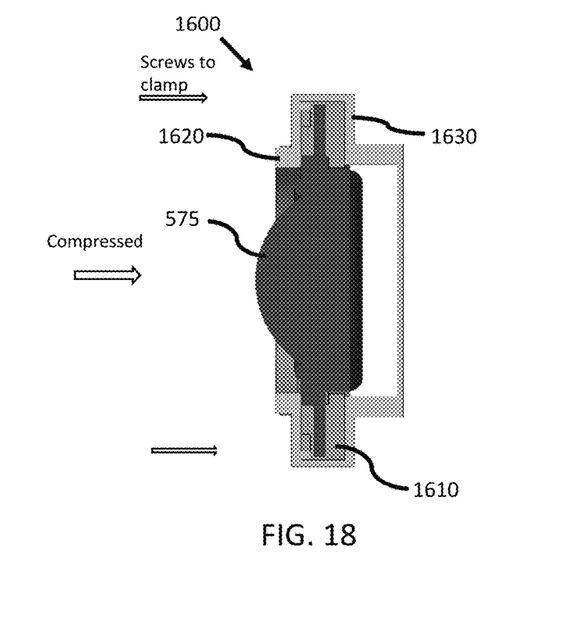

Referring now to FIGS. 16-18, a speaker package 1600 is depicted in different phases of assembly. Speaker package 1600 includes a speaker driver 575 and a shock absorbing material 1610. Shock absorbing material 1610 may be silicone or other foam or rubber materials. In accordance with various illustrative embodiments, shock absorbing materials may be prertensioned so that the material still maintains energy absorbing properties when it is compressed between a first speaker mount part 1620 and a second speaker mount part 1630 by screws 1640. Screws 1640 clamp first speaker mount part 1620 and second speaker mount part 1630 by engaging with and screwing into housing 1200 so that speaker package 1600 is part of modular electronics package 900.

Figure 19:
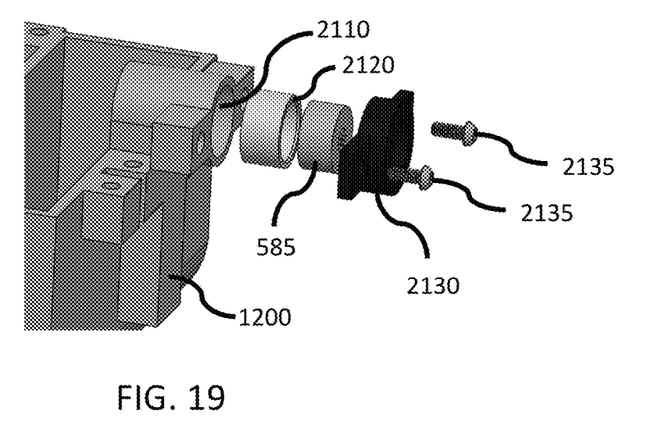
FIGS. 19 and 20 are illustrative embodiments of the microphone assembly.
Figure 20:
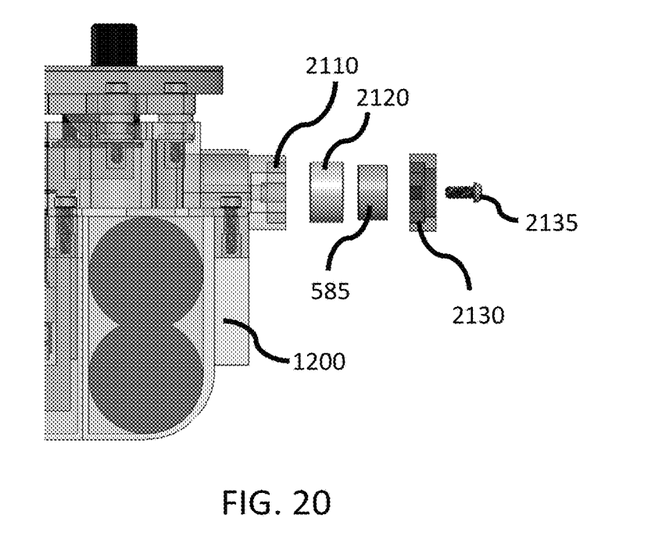

Referring now to FIGS. 19 and 20, a microphone 585 is depicted being assembled into housing 1200 which has a microphone receiver 2110. Microphone 585 is also supported by and cushioned by a shock absorbing ring 2120 which may be a rubber, silicone, or foam ring, or the like. A microphone cover 2130 is configured to hold microphone 585 in place by screws 2135.

Figure 21:
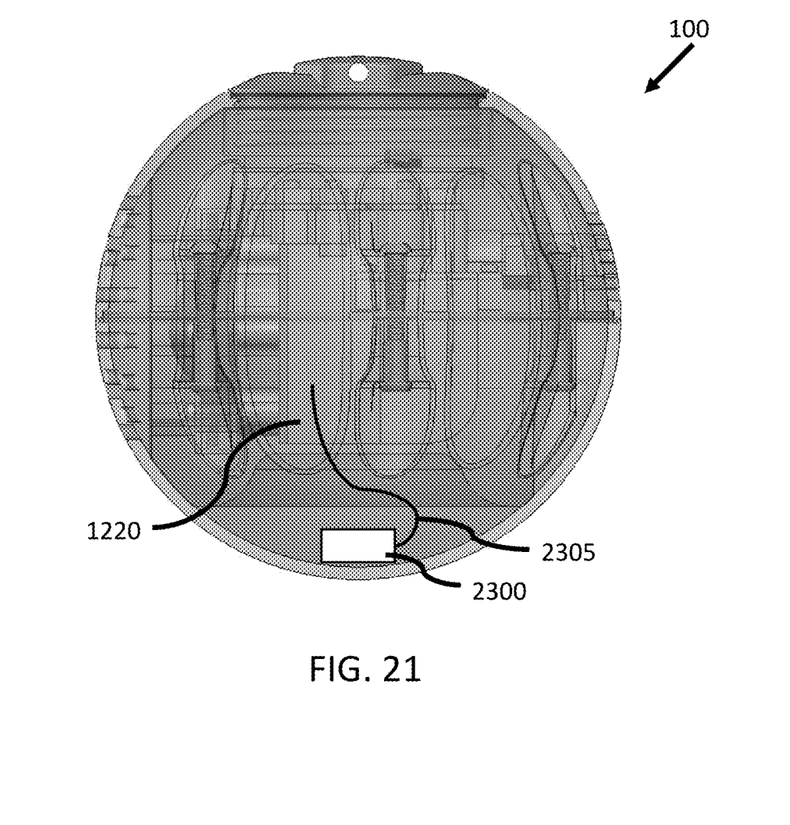
FIG. 21 is an illustrative embodiment of the antenna assembly.

Referring now to FIG. 21, throw phone 100 is depicted with a patch antenna 2300 coupled to lower shell section 120. A loop wire 2305 connects patch antenna 2300 to electronics board 1220. Other antenna configurations may also be used without departing from the scope of the disclosure.

As has been described herein in relation to throw phone 100 and like throw phones and throw devices, this device construction allows the electronic payload to sustain multiple repetitive high energy impacts with small recovery time. One should note that improved performance may be achieved by providing dual shock isolation by mounting the electronics board along a "main" axis. The payload weight may then be distributed such that it is offset so that when the ball is dropped it wants to fall along the main axis. Another characteristic sought by the disclosed design is that the electronic PCB assembly is constructed to be as stiff as possible with high natural frequency to ensure that local deflections are small enough to not break off components/ solder joints. To achieve this, it may be beneficial to orient the PCB along the main impact axis such that the "weak" vibration mode axis is perpendicular to it so that likelihood of exciting the "structurally weak mode" is less likely. In various illustrative embodiments it has been explained shown that the weak axis of the PCB has a foam absorber to have additional support and energy absorption. In some embodiments, it may be desired that the PCB stack can be completely potted/encapsulated in epoxy or silicone, such as but not limited to Dow Sylgard™, for example, or other like material to increase the stiffness of the PCB stack and hence the natural frequency, as much as possible. Also in various illustrative embodiments, the silicone sleeve may be notched and affixed between shells with pillars to prevent the payload from shifting too much and the user having access to the user interface always, even after repeated high energy drops. It further may be noted that the material used for the sleeve may be of very low durometer (00 Shore hardness range), e.g. silicone with air bubbles dispersed in it. Such very low durometer silicone with dispersed air molecules can be used as a high energy absorption suspension material with low hysteresis (tuning the material durometer, macroscopic shape of the material and air molecules density and size can tune the suspension characteristics). In other embodiments it may be desired to shape the sleeve material macroscopically to create zones where there is high stress to allow for extreme elongation/deformation (high dynamic strain). This increases the natural shock dampening characteristics. If there is no room for localized material elongation/deformation then the suspension dampening equates to the intrinsic material property. The allowable elongation for a specific application should not be beyond a certain value or else the rebounding of the material to original state would take longer. Further still, it may be beneficial to symmetrically encapsulates the payload from all directions to create an almost omni-directional suspension. It is also noted that the speaker and mic may be acoustically isolated within the ball shell. The silicone may help in acoustic vibration absorption and the same silicone sleeve acts to prevent ingress of water/debris.

Figure 22:
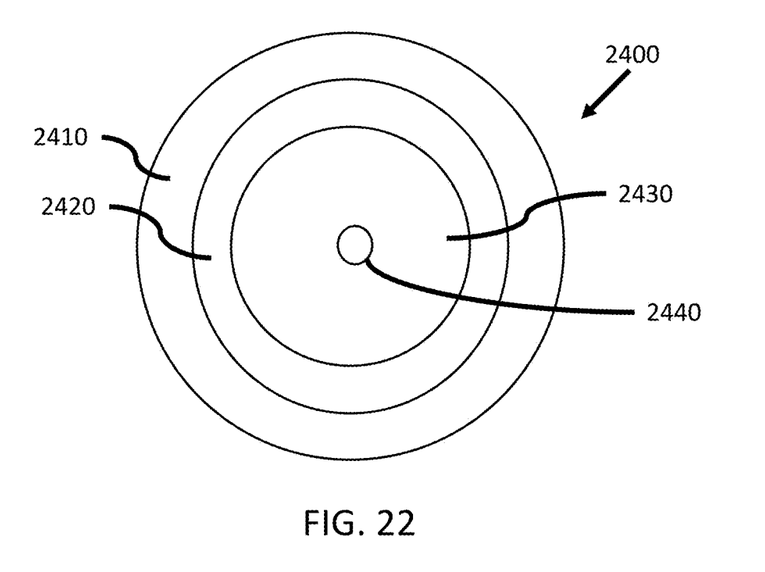
FIG. 22 is a schematic of an alternative material arrangement.

Referring now to FIG. 22, a representative schematic of the use of a multilayer sleeve design 2400 for an alternative throw phone design is depicted. Here, instead of using a single visco-elastic material for the first stage of shock absorption as described above, a multi-material discrete layer system may be used to design viscoelastic macro behavior spatially (i.e., one can tune macroscopic system performance to be viscoelastic such that during impact the "bottoming out" of payload to hard exterior can be controlled in a tightly space constrained system). In such a multi-layer system, a substantially rigid outer layer 2410 may be used similar to throw phone 100. Next, a very soft highly viscous material 2420 which is very compliant and good at dampening, and which flows and deforms easily on outside layer (i.e. has a high strain rate) which is best suited for absorbing and dissipating impact shock energy. Next, a stiffer elastic material 2430 which is springier near the payload 2440 is configured to be great at settling to equilibrium quickly after impact and dissipating transient-post-impact vibrations since it has high natural frequency. The proportion of each type of material 2420 and 2430 and choice of specific properties of each can lead to range of different system impact performance behaviors and can be optimized through numerical modelling methods or experiment.

Figure 23:
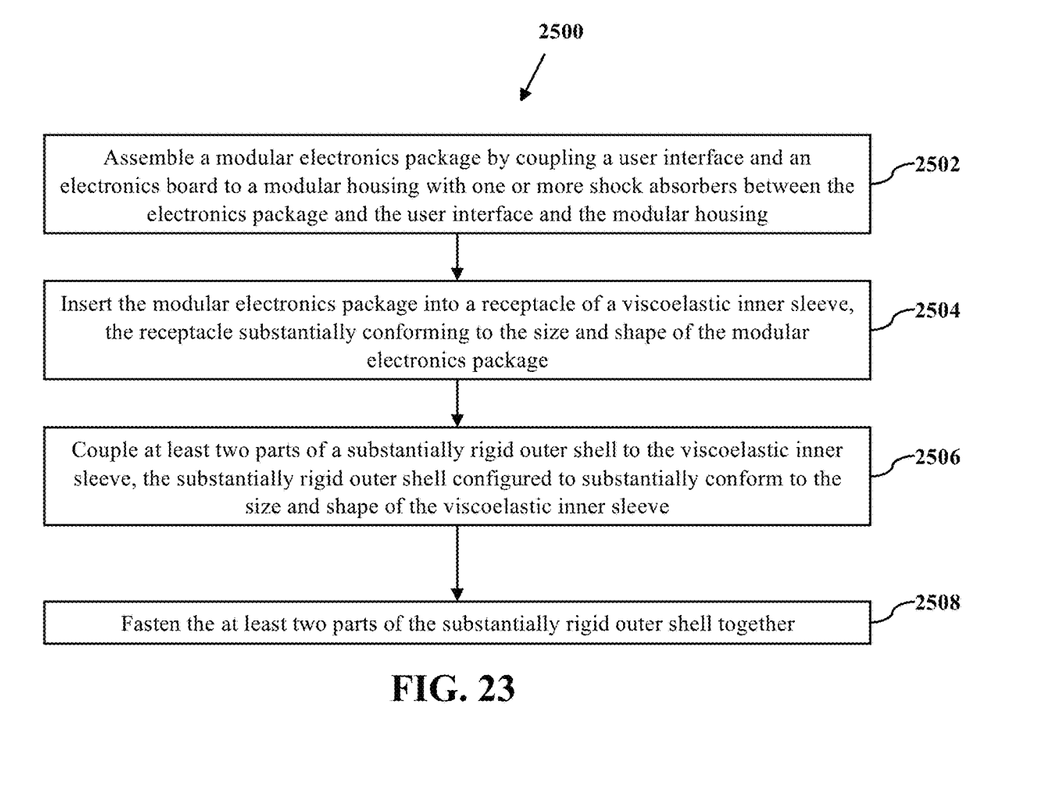
FIG. 23 is a process diagram relating to assembly.

Referring now to FIG. 23 a process diagram of an example process 2500 is depicted. In some implementations, one or more process blocks of FIG. 23 may be performed by a machine or by hand. As shown in FIG. 23, process 2500 may include assembling a modular electronics package by coupling an user interface and an electronics board to a modular housing with one or more shock absorbers between the electronics package and the user interface and the modular housing (block 2502). For example, device may assemble a modular electronics package by coupling an user interface and an electronics board to a modular housing with one or more shock absorbers between the electronics package and the user interface and the modular housing, as described above. As also shown in FIG. 23, process 2500 may include inserting the modular electronics package into a receptacle of a viscoelastic inner sleeve, the receptacle substantially conforming to the size and shape of the modular electronics package (block 2504). For example, device may insert the modular electronics package into a receptacle of a viscoelastic inner sleeve, the receptacle substantially conforming to the size and shape of the modular electronics package, as described above. As further shown in FIG. 23, process 2500 may include coupling at least two parts of a substantially rigid outer shell to the viscoelastic inner sleeve, the substantially rigid outer shell configured to substantially conform to the size and shape of the viscoelastic inner sleeve (block 2506). For example, device may couple at least two parts of a substantially rigid outer shell to the viscoelastic inner sleeve, the substantially rigid outer shell configured to substantially conform to the size and shape of the viscoelastic inner sleeve, as described above. As also shown in FIG. 23, process 2500 may include fastening the at least two parts of the substantially rigid outer shell together (block 2508). For example, device may fasten the at least two parts of the substantially rigid outer shell together, as described above.

Although FIG. 23 shows example blocks of process 2500, in some implementations, process 2500 may include additional blocks, fewer blocks, different blocks, or differently arranged blocks than those depicted in FIG. 23. Additionally, or alternatively, two or more of the blocks of process 2500 may be performed in parallel.

The mechanical construction shown and described may be varied without departing from the scope of the invention as clearly defined by the claims.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B." With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A ruggedized communication device, comprising:
    a modular electronics package, the modular electronics package including:
        a modular housing;
        a user interface;
        an electronics board coupled to the user interface; and
        one or more shock absorbers coupling the user interface and the electronics board to the modular housing;
    a substantially rigid outer shell defining an exterior surface and an interior surface; and
    a viscoelastic inner sleeve conforming substantially to the interior surface and configured with a receptacle substantially conforming to the size and shape of the modular electronics package.

2. The ruggedized communication device of claim 1, wherein the modular electronics package includes a wireless communications chip.

3. The ruggedized communication device of claim 2, further comprising:
a speaker coupled to the electronics board; and
a microphone coupled to the electronics board,
wherein two-way communications are enabled by the wireless communication chip.

4. The ruggedized communication device of claim 3, wherein the speaker and microphone are mounted diametrically opposite each other relative to the substantially rigid outer shell.

5. The ruggedized communication device of claim 3, wherein the microphone is mounted to the modular housing by a shock absorbing sleeve.

6. The ruggedized communication device of claim 1, further comprising:
a speaker module including:
a first speaker mount part;
a second speaker mount part;
a speaker driver; and
a shock absorber element,
wherein the speaker driver and the shock absorber element are at least partially sandwiched between the first speaker mount part and the second speaker mount part.

7. The ruggedized communication device of claim 6, wherein the shock absorber material is a pre-tensioned material.

8. The ruggedized communication device of claim 6, wherein the speaker module is configured to be coupled to the modular housing.

9. The ruggedized communication device of claim 1, wherein the exterior surface of the substantially rigid outer shell is substantially spherical.

10. The ruggedized communication device of claim 1, wherein the rigid outer shell includes more than one outer shell portion and the more than one outer shell portions are configured to be coupled with tamper resistant elements.

11. The ruggedized communication device of claim 1, wherein the viscoelastic inner sleeve comprises silicone.

12. The ruggedized communication device of claim 1, wherein the viscoelastic inner sleeve comprises soft durometer silicone.

13. The ruggedized communication device of claim 1, wherein the electronics board is epoxy encapsulated.

14. A method of assembling a ruggedized communication device, comprising:
assembling a modular electronics package by coupling a user interface and an electronics board to a modular housing with one or more shock absorbers between the electronics package and the user interface and the modular housing;
inserting the modular electronics package into a receptacle of a viscoelastic inner sleeve, the receptacle substantially conforming to the size and shape of the modular electronics package; and
coupling at least two parts of a substantially rigid outer shell to the viscoelastic inner sleeve, the substantially rigid outer shell configured to substantially conform to the size and shape of the viscoelastic inner sleeve; and
fastening the at least two parts of the substantially rigid outer shell together.

15. The method of claim 14, further comprising:
at least partially sandwiching a speaker driver and a shock absorber element between
a first speaker mount part and a second speaker mount part.

16. The method of claim 15, further comprising:
pre-tensioning the shock absorber element.

17. The method of claim 14, further comprising:
forming the modular housing from a molding process.

18. The method of claim 14, further comprising:
forming the viscoelastic inner sleeve from a molding process.

19. A ruggedized communication device, comprising:
a modular electronics package, the modular electronics package including:
a modular housing;
a user interface;
an electronics board coupled to the user interface; and
one or more shock absorbers coupling the user interface and the electronics board to the modular housing;
a substantially rigid outer shell defining an exterior surface and an interior surface; and
a multi-layer inner sleeve conforming substantially to the interior surface and configured with a receptacle substantially conforming to the size and shape of the modular electronics package, the multi-layer inner sleeve including a first sleeve layer and a second sleeve layer inside the first sleeve layer, the first sleeve layer and the second sleeve layer comprise different materials.

20. The ruggedized communication device of claim 19, wherein the first sleeve layer material has a lower elastic modulus than the second sleeve material.

* * * * *